United States Patent
Sanelle et al.

(10) Patent No.: US 6,181,394 B1
(45) Date of Patent: Jan. 30, 2001

(54) SUPER BRIGHT LOW REFLECTION LIQUID CRYSTAL DISPLAY

(75) Inventors: Joseph J. Sanelle; Diggy R. Breiling, both of Westboro, MA (US)

(73) Assignee: White Electronic Designs, Corp., Phoenix, AZ (US)

( * ) Notice: Under 35 U.S.C. 154(b), the term of this patent shall be extended for 0 days.

(21) Appl. No.: 09/235,584

(22) Filed: Jan. 22, 1999

(51) Int. Cl.[7] .................. G02F 1/1335; G02F 1/1343
(52) U.S. Cl. .................. 349/96; 349/122; 349/139; 349/137; 349/158; 349/161
(58) Field of Search .................. 349/96, 117, 158, 349/161, 40, 122, 137, 139, 54

(56) References Cited

U.S. PATENT DOCUMENTS

| | | | |
|---|---|---|---|
| 3,869,196 | * 3/1975 | Kubota | 349/137 |
| 5,179,457 | * 1/1993 | Hirataka et al. | 349/119 |
| 5,430,607 | * 7/1995 | Smith | 361/683 |
| 5,523,873 | * 6/1996 | Bradford, III et al. | 349/139 |
| 5,570,214 | 10/1996 | Abileah et al. | |
| 5,594,568 | 1/1997 | Abileah et al. | |
| 5,706,068 | 1/1998 | Abileah et al. | |
| 5,739,881 | 4/1998 | Xu et al. | |
| 5,818,559 | * 10/1998 | Yoshida | 349/96 |

* cited by examiner

Primary Examiner—William L. Sikes
Assistant Examiner—Tai V. Duong
(74) Attorney, Agent, or Firm—Kriegsman & Kriegsman

(57) ABSTRACT

A liquid crystal display (LCD) exhibiting enhanced optical viewing performance. In a preferred embodiment, the LCD comprises a first glass substrate, a second glass substrate and an active matrix liquid crystal display (AMLCD) panel. The LCD also comprises a rear polarizer adhered to the rear of the AMLCD panel with an index-matched, pressure sensitive adhesive (PSA). The LCD further comprises an indium tin oxide coating adapted for use as a heating element, the coating being applied to the front of the second glass substrate. The heating element is also adhered to the rear polarizer with a silicone-based, index-matched, optical bonding material. In addition, the LCD comprises an indium tin oxide coating usable as an electromagnetic interference (EMI) shield, the coating being applied to the rear of the first glass substrate. The EMI shield is also adhered to the front of the AMLCD panel with the above-mentioned silicone-based bonding material. The LCD also comprises a front polarizer crossed relative to the rear polarizer. The front polarizer is adhered to the front of the first glass substrate by the above-mentioned silicone-based bonding material. The LCD additionally comprises a third glass substrate bonded to the front of the front polarizer by the above-mentioned index-matched PSA. The LCD further includes an anti-reflection coating applied to the front of the third glass substrate. The LCD also includes a backlight positioned behind the second glass substrate.

19 Claims, 1 Drawing Sheet

SUPER BRIGHT LOW REFLECTION LIQUID CRYSTAL DISPLAY

BACKGROUND OF THE INVENTION

The present invention relates generally to liquid crystal displays and more particularly to an improved liquid crystal display exhibiting enhanced optical viewing performance.

Liquid crystal displays, which were first introduced in the 1970's and have since been used in watches, clocks, pocket calculators, portable personal computers, navigational instruments and the like, are electronically switched displays that make use of changes in the reflective properties of liquid crystals present in an electric field. A typical liquid crystal display comprises a liquid crystal display panel, said panel comprising a thin film of liquid crystals sandwiched between a pair of transparent electrodes. The ruggedized liquid crystal display panel is typically positioned between a pair of glass plates, the glass plates being sealed together around their respective edges. The glass plates may be assembled with spacers between them to maintain a constant separation distance. Two crossed axis polarizers are adhered to the respective inside surfaces of the glass plates, one polarizer also being adhered to the front of the liquid crystal display panel and the other polarizer also being adhered to the rear of the liquid crystal display panel. When a voltage is applied selectively across the electrodes, the liquid crystal molecules between them are rearranged or switched in polarization so that light is either reflected or absorbed in the region bounded by the electrodes to form characters or graphics. Many liquid crystal displays include a backlight for night or dark viewing, and many liquid crystal displays include a layer of indium tin oxide or another suitable material positioned between the front polarizer and the front glass plate for use as an electromagnetic interference shield. Some liquid crystal displays intended for use in cold environments also include a layer of indium tin oxide or another suitable material positioned between the rear polarizer and the rear glass plate and electrically connected to a power source for use as a heating element.

Some of the advantages of liquid crystal displays, as compared to other digital displays, are their comparatively low voltage and power requirements. Unfortunately, however, one of the principal disadvantages of liquid crystal displays is that, due to their low contrast and a "washed-out" effect caused by back-reflected ambient light seen by a viewer, they cannot easily be read under high ambient light conditions, such as when placed in direct sunlight.

One approach which has been taken to improve the viewing performance of liquid crystal displays, particularly when viewed under high ambient light conditions, has been to apply an anti-reflection coating to the front of the display. Although such an approach has provided some improvement to the viewing characteristics of liquid crystal displays by reducing the amount of back-reflected light seen by the viewer, further improvement is greatly needed.

A few patents in the field of liquid crystal display technology are described below.

In U.S. Pat. No. 5,570,214, inventors Abileah et al., which issued Oct. 29, 1996, and which is incorporated herein by reference, there is disclosed a liquid crystal display comprising a plurality of pixels, each of the pixels being comprised of a pair of driving electrodes and a twisted nematic liquid crystal material located therebetween. The liquid crystal material is of a thickness "d" and has an anistrophy $\Delta N$ such that the product of $d \cdot \Delta N$ is about 400–550 nm, and the liquid crystal material is capable of twisting at least one normally incident visible wavelength of light passing therethrough in an amount of about 80°–100°. The device also comprises a rear, light-entrance polarizer having a transmission axis oriented in a first direction, a front, light-exit polarizer having a transmission axis oriented in a second direction with respect to the first direction thereby to define a normally white display, a rear retardation film disposed between the rear polarizer and the twisted nematic liquid crystal material, and a front retardation film disposed between the front polarizer and the liquid crystal material. The transmission axes of the retardation films are so arranged each with respect to the others so as to achieve a white light contrast ratio of at least about 10:1 over a horizontal angular span of at least about 100° and over a vertical angular span of greater than about 55°.

In U.S. Pat. No. 5,594,568, inventors Abileah et al., which issued Jan. 14, 1997, and which is incorporated herein by reference, there is disclosed a normally white liquid crystal display comprising a rear, light-entrance polarizer having a transmission axis oriented in a first direction; a front, light-exit polarizer having a transmission axis oriented in a second direction with respect to the first direction so as to define a normally white display; a twisted nematic liquid crystal layer; and first and second positively birefringent uniaxial retardation films both disposed between the twisted nematic liquid crystal layer and one of the rear, light-entrance polarizer and the front, light-exit polarizer. The liquid crystal layer in the off state twists at least one normally incident visible wavelength of light less than about 110° as it passes therethrough, and the first and second uniaxial retardation films have retardation values of from about 80–200 nm. The transmission axes of the polarizers and optical axes of the retardation films are so arranged each with respect to the others so as to achieve high contrast ratios over a large range of predetermined viewing angles.

In U.S. Pat. No. 5,706,068, inventors Abileah et al., which issued Jan. 6, 1998, and which is incorporated herein by reference, there is disclosed a liquid crystal display comprising a plurality of pixels, each of the pixels being comprised of a pair of driving electrodes and a twisted nematic liquid crystal material located therebetween. The liquid crystal material is of a thickness "d" and has an anistrophy $\Delta N$ such that the product of $d \cdot \Delta N$ is about 400–550 nm, and the liquid crystal material is capable of twisting at least one normally incident visible wavelength of light passing therethrough in an amount of about 800°–100°. The device also comprises a rear, light-entrance polarizer having a transmission axis oriented in a first direction, a front, light-exit polarizer having a transmission axis oriented in a second direction with respect to the first direction thereby to define a normally white display, a rear retardation film disposed between the rear polarizer and the twisted nematic liquid crystal material, and a front retardation film disposed between the front polarizer and the liquid crystal material. The transmission axes of the retardation films are so arranged each with respect to the others so as to achieve a white light contrast ratio of at least about 10:1 over a horizontal angular span of at least about 100° and over a vertical angular span of greater than about 55°.

In U.S. Pat. No. 5,739,881, inventors Xu et al., which issued Apr. 14, 1998, and which is incorporated herein by reference, there is disclosed a normally white twisted nematic liquid crystal display comprising a liquid crystal layer for twisting at least one normally incident visible wavelength of light from about 80° to 100° as it passes therethrough when the liquid crystal layer is in substantially the off-state thereby defining a twisted nematic display. The display also comprises a pair of negative retarders sandwiching the liquid crystal layer therebetween and a pair of positive retarders sandwiching both the liquid crystal layer and the negative retarders therebetween, wherein the retardation value of each of the negative retarders is from about −60 to −200 nm and the retardation value of each of the positive retarders is from about 80 to 200 nm.

SUMMARY OF THE INVENTION

It is an object of the present invention to provide a novel liquid crystal display.

It is another object of the present invention to provide a liquid crystal display that ameliorates at least some of the problems discussed above in connection with existing liquid crystal displays.

It is yet another object of the present invention to provide a liquid crystal display as described above that includes a novel optical filtering arrangement.

The present invention is based, in part, on the innovative discovery that the amount of back-reflected light seen by a viewer of a liquid crystal display can be substantially reduced and, therefore, that the viewing characteristics of a liquid crystal display can be substantially improved by moving the front polarizer from its conventional location where it is adhered to the front surface of the liquid crystal display panel and is positioned rearwardly relative to a first glass plate to a new location where it is in front of said first glass plate and is adhered to the back surface of another glass plate itself positioned in front of said first glass plate.

Therefore, according to one aspect of the invention, there is provided a liquid crystal display comprising (a) a first glass plate; (b) a second glass plate; (c) a liquid crystal display panel positioned between said first and second glass plates; (d) a rear polarizer positioned between said liquid crystal display panel and said second glass plate; and (e) a front polarizer positioned in front of said first glass plate, said front polarizer being crossed relative to said rear polarizer.

In a preferred embodiment, the liquid crystal display comprises a first glass substrate, a second glass substrate and an active matrix liquid crystal display panel. The display additionally comprises a rear polarizer, the front surface of said rear polarizer being adhered to the rear surface of the active matrix liquid crystal display panel with an index-matched, pressure sensitive adhesive. The display further comprises an indium tin oxide thin film coating adapted to be used as a heating element, said coating being applied to the front surface of the second glass substrate. The front surface of said heating element is adhered to the rear surface of the rear polarizer with a silicone-based, index-matched, optical bonding material.

In addition, said ruggedized liquid crystal display may comprise an indium tin oxide thin film coating usable as an electromagnetic interference (EMI) shield, said coating being applied to the rear surface of the first glass substrate. The rear surface of said EMI-coated glass substrate is adhered to the front surface of the active matrix liquid crystal display panel with the above-mentioned silicone-based, index-matched, optical bonding material.

The display also comprises a front polarizer, said front polarizer having a crossed axis relative to said rear polarizer. The rear surface of the front polarizer is adhered to the front surface of the first glass substrate by the above-mentioned silicone-based, index-matched, optical bonding material. The display additionally comprises a third glass substrate, the rear surface of the third glass substrate being bonded to the front of the front polarizer by the above-mentioned index-matched, pressure sensitive adhesive. The display further includes an anti-reflection (AR) thin film coating applied to the front surface of the third glass substrate.

In order to minimize the reflection of ambient light by the display into the view of an observer, the various elements of the display preferably have respective indices of refraction that differ as minimally as possible. Nevertheless, as can readily be appreciated, this index-matching approach cannot completely eliminate the reflection of ambient light off the various elements of the display. In fact, some elements, such as the indium tin oxide electromagnetic interference shield, are quite reflective. The placement of the front polarizer in front of the indium tin oxide electromagnetic interference shield in accordance with the teachings of the present invention, instead of behind it, substantially ameliorates the problem of reflection off said electromagnetic interference shield. This is because ambient light passing through said front polarizer becomes polarized in a first direction. If said polarized ambient light is then reflected off said electromagnetic interference shield, its polarization state changes in such a way that it cannot pass back through said front polarizer into the view of the viewer.

The terms "front," "in front of," "front surface" or the like, when used herein to describe an element of a liquid crystal display or to denote the relative positions of two or more elements of a liquid crystal display, refer directionally to the viewer side of the liquid crystal display. The terms "behind," "in back of," "rear surface" or the like, when used herein to describe an element of a liquid crystal display or to denote the relative positions of two or more elements of a liquid crystal display, refer directionally to the side of the liquid crystal display facing away from the viewer, typically the backlight side of the display.

Additional objects, features, aspects and advantages of the present invention will be set forth, in part, in the description which follows and, in part, will be obvious from the description or may be learned by practice of the invention. Certain embodiments of the invention will be described hereafter in sufficient detail to enable those skilled in the art to practice the invention, and it is to be understood that other embodiments may be utilized and that structural or other changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawing, which is hereby incorporated into and constitutes a part of this specification, illustrates a preferred embodiment of the invention and, together with the description, serves to explain the principles of the invention. In the drawing wherein like reference numerals represent like parts.

DETAILED DESCRIPTION OF PREFERRED EMBODIMENTS

Figure 1:
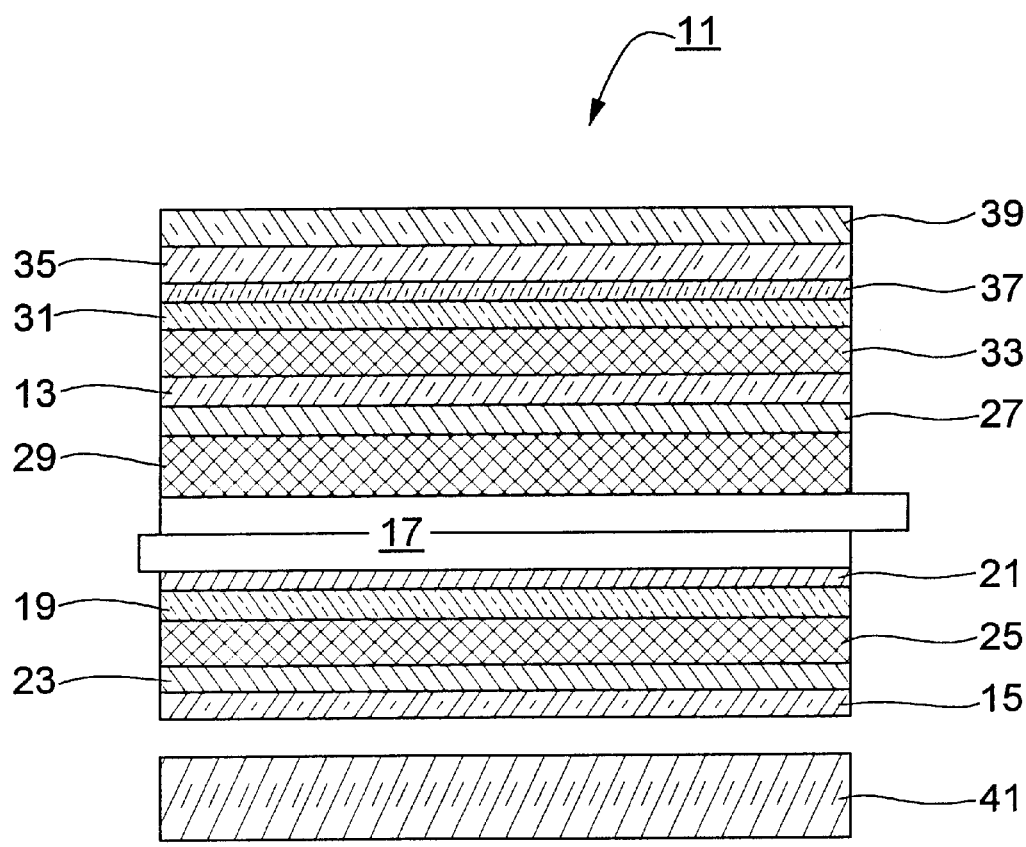
FIG. 1 is a schematic section view of one embodiment of a liquid crystal display constructed according to the teachings of the present invention.

As noted above, the present invention is directed to the problem of poor viewing performance or "washout" in liquid crystal displays, said problem occurring most notably under high ambient light conditions. More specifically, the problem is caused by the reflection of ambient light by the liquid crystal display back towards the viewer, thereby obscuring the image generated by the liquid crystal display. Moreover, in those instances in which the liquid crystal display includes an electromagnetic interference shield, often in the form of an indium tin oxide coating applied to the rear surface of the front glass panel of the display, the problem of ambient light reflection into the view of an observer is made more acute.

As will hereinafter be described, the present inventors have addressed the foregoing problem by, among other things, re-positioning the front polarizer of the liquid crystal display so that it is placed in front of the electromagnetic interference shield, instead of behind it. In this manner, as ambient light passes through the front polarizer, said ambient light becomes polarized in a first direction. If said polarized ambient light is then reflected off said electromagnetic interference shield, its state of polarization changes. With its polarization state thus changed, the reflected ambient light cannot pass back through the front polarizer into the view of the observer.

Referring now to FIG. 1, there is shown a schematic section view of one embodiment of a liquid crystal display constructed according to the teachings of the present invention, said liquid crystal display being represented generally by reference numeral 11.

Liquid crystal display 11 comprises a first glass substrate 13, a second glass substrate 15 and a liquid crystal display (LCD) panel 17, LCD panel 17 being positioned between glass substrates 13 and 15. Glass substrates 13 and 15, which may be conventional in nature, typically have a thickness of about 0.04 inch and may be made of a borosilicate, a sodalime or the like. Preferably, glass substrates 13 and 15 have indices of refraction that substantially match that of LCD panel 17. LCD panel 17, which is preferably (but not necessarily) an active matrix liquid crystal display (AMLCD) panel, may be conventional in nature and includes liquid crystals (not shown) sandwiched between a pair of transparent electrodes (not shown).

Display 11 also comprises a rear polarizer 19, rear polarizer 19 preferably having an index of refraction that substantially matches that of LCD panel 17. The front surface of rear polarizer 19 is preferably adhered to the rear surface of LCD panel 17 with a layer 21 of a conventional indexmatched, pressure sensitive adhesive (layer 21 being about 0.001 inch in thickness). (Where rear polarizer 19 is a conventional non-compensated linear polarizer, layer 21 may be applied to polarizer 19 by the polarizer's manufacturer.) Rear polarizer 19 may be, for example, a conventional linear polarizer with an expanded viewing angle compensation film (for use in countering the birefringent effect of the liquid crystal material in panel 17) or a conventional non-compensated linear polarizer. Where rear polarizer 19 is a linear polarizer with an expanded viewing angle compensation film, the compensation film faces forwardly towards panel 17.

In addition, display 11 preferably comprises a thin film coating 23 applied to the front surface of second glass substrate 15. Coating 23, whose index of refraction substantially matches that of glass substrate 15, is preferably made of indium tin oxide or another suitable material so that, when coupled to a power source, coating 23 serves as a heating element to heat display 11 when it is used in cold ambient temperature conditions. The front surface of coating 23 is preferably adhered to the rear surface of rear polarizer 19 with a layer 25 of an index-matched, optical bonding material. Layer 25, which may be made of, for example, a silicone-based or epoxy-based, index-matched, optical bonding material, advantageously eliminates any air gap between rear polarizer 19 and coating 23.

Display 11 preferably further comprises an electromagnetic interference (EMI) shield 27. EMI shield 27, which is preferably in the form of an indium tin oxide thin film coating applied to the rear surface of first glass substrate 13, shields LCD panel 17 from incoming electromagnetic radiation by absorbing said radiation. EMI shield 27 preferably has an index of refraction that substantially matches that of LCD panel 17, and the rear surface of EMI shield 27 is preferably adhered to the front surface of LCD panel 17 with a layer 29 of the above-mentioned index-matched, optical bonding material.

Display 11 also comprises a front polarizer 31, front polarizer 31 being similar to rear polarizer 19 but crossed relative thereto. Where front polarizer 31 (like rear polarizer 19) includes a compensation film, the compensation film of front polarizer 31 faces forwardly away from LCD panel 17. Front polarizer 31 preferably has an index of refraction substantially matching that of first glass substrate 13, and the rear surface of front polarizer 31 is preferably adhered to the front surface of first glass substrate 13 by a layer 33 of the above-mentioned index-matched, optical bonding material.

Display 11 additionally comprises a third glass substrate 35, which may be identical in composition to glass substrates 13 and 15. Third glass substrate 35 preferably has index of refraction substantially matching that of front polarizer 31, and the rear surface of third glass substrate 35 is preferably bonded to the front of front polarizer 31 by a layer 37 of the above-mentioned index-matched, pressure sensitive adhesive. The peripheries of first glass substrate 13, second glass substrate 15 and third glass substrate 35 are preferably externally sealed to contain those elements of display 11 sandwiched therebetween.

Display 11 further includes a conventional anti-reflection thin film coating 39 applied to the front surface of third glass substrate 35. Coating 39, which is typically about 1–2 microns thick, may be made of, for example, magnesium fluoride and/or quartz.

Display 11 further includes a backlight 41, which may be conventional in nature, positioned behind second glass substrate 15.

Display 11 may be used in the conventional manner; however, because of its construction, display 11 exhibits improved optical viewing performance.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A liquid crystal display comprising:
    (a) a first glass plate;
    (b) a second glass plate;
    (c) a liquid crystal display panel positioned between said first and second glass plates;
    (d) a rear polarizer positioned between said liquid crystal display panel and said second glass plate;
    (e) a front polarizer positioned in front of said first glass plate, said front polarizer being crossed relative to said rear polarizer; and
    (f) an electromagnetic interference shield positioned between said first glass plate and said liquid crystal display panel.

2. The liquid crystal display as claimed in claim 1 wherein said electromagnetic interference shield is an indium tin oxide thin film coating applied to the first glass plate.

3. A liquid crystal display comprising:
   (a) a first glass substrate;
   (b) a second glass substrate;
   (c) a liquid crystal display panel positioned between said first and second glass substrates;
   (d) a rear polarizer positioned between said liquid crystal display panel and said second glass substrate;
   (e) a front polarizer positioned in front of said first glass substrate, said front polarizer being crossed relative to said rear polarizer;
   (f) an electromagnetic interference shield positioned between said first glass substrate and said liquid crystal display panel; and
   (g) a third glass substrate positioned in front of said front polarizer.

4. A liquid crystal display comprising:
   (a) a first glass substrate;
   (b) a second glass substrate;
   (c) a liquid crystal display panel positioned between said first and second glass substrates;
   (d) a rear polarizer positioned between said liquid crystal display panel and said second glass substrate;
   (e) a front polarizer positioned in front of said first glass substrate, said front polarizer being crossed relative to said rear polarizer;
   (f) an electromagnetic interference shield positioned between said first glass substrate and said liquid crystal display panel; and
   (g) a third glass substrate positioned in front of said front polarizer;
   (h) wherein all of said first glass substrate, said second glass substrate, said third glass substrate, said front polarizer, said rear polarizer and said electromagnetic interference shield have indices of refraction that are substantially matched.

5. The liquid crystal display as claimed in claim 4 further comprising a heating element positioned between said rear polarizer and said second glass substrate and adapted to be connected to a power source for use as a heating element, said heating element having an index of refraction substantially matching that of said rear polarizer and that of said second glass subtrate.

6. The liquid crystal display as claimed in claim 5 wherein said heating element is a coating applied to said second glass substrate and wherein said electromagnetic shield is a coating applied to said first glass substrate.

7. The liquid crystal display as claimed in claim 6 wherein said front polarizer is adhered to said third glass substrate with an index-matched pressure sensitive adhesive and is bonded to said first glass substrate with an index-matched optical bonding material, wherein said rear polarizer is adhered to said liquid crystal panel with an index-matched pressure sensitive adhesive and is bonded to said heating element with an index-matched optical bonding material and wherein said electromagnetic interference shield is bonded to said liquid crystal display panel with an index-matched optical bonding material.

8. The liquid crystal display as claimed in claim 7 further comprising an anti-reflection coating applied to the front of said third glass substrate.

9. The liquid crystal display as claimed in claim 8 further comprising a backlight positioned behind said second glass substrate.

10. The liquid crystal display as claimed in claim 9 wherein said liquid crystal display panel is an active matrix liquid crystal display panel.

11. The liquid crystal display as claimed in claim 9 wherein said front and rear polarizers are non-compensated linear polarizers.

12. A liquid crystal display comprising:
    (a) a first glass plate;
    (b) a second glass plate;
    (c) a liquid crystal display panel positioned between said first and second glass plates;
    (d) a rear polarizer positioned between said liquid crystal display panel and said second glass plate, said rear polarizer being adhered directly to said liquid crystal display panel with a first adhesive;
    (e) a front polarizer positioned in front of said first glass plate and adhered directly to said first glass plate with a second adhesive, said front polarizer being crossed relative to said rear polarizer; and (f) an electromagnetic interference shield positioned between said first glass plate and said liquid crystal display panel, said electromagnetic interference shield being adhered directly to said liquid crystal display panel.

13. The liquid crystal display as claimed in claim 12 wherein said electromagnetic interference shield is a coating applied to said first glass plate.

14. The liquid crystal display as claimed in claim 13 further comprising a heating element positioned between said rear polarizer and said second glass plate and adapted to be connected to a power source for use as a heater, said heating element being a coating applied to said second glass plate and adhered directly to said rear polarizer.

15. The liquid crystal display as claimed in claim 14 further comprising a third glass plate, said third glass plate being positioned in front of and adhered directly to said front polarizer.

16. The liquid crystal display as claimed in claim 15 further comprising an anti-reflection coating applied to the front of said third glass plate.

17. A liquid crystal display comprising:
    (a) a liquid crystal display panel;
    (b) a single rear glass plate positioned behind said liquid crystal display panel;
    (c) a first front glass plate, said first front glass plate being positioned in front of said liquid crystal display panel;
    (d) a rear polarizer positioned between said liquid crystal display panel and said single rear glass plate;
    (e) a front polarizer positioned in front of said first front glass plate, said front polarizer being crossed relative to said rear polarizer; and
    (f) an electromagnetic interference shield positioned between said first front glass plate and said liquid crystal display panel.

18. The liquid crystal display as claimed in claim 17 further comprising a second front glass plate, said second front glass plate being positioned in front of said front polarizer.

19. A liquid crystal display comprising:
    (a) a first glass plate;
    (b) a second glass plate;
    (c) a liquid crystal display panel positioned between said first and second glass plates;
    (d) a rear polarizer positioned between said liquid crystal display panel and said second glass plate;
    (e) a front polarizer positioned in front of said first glass plate, said front polarizer being crossed relative to said rear polarizer;

(f) a third glass plate positioned in front of said front polarizer, said front polarizer being directly adhered to said third glass plate with a first adhesive, wherein said first adhesive is an index-matched, pressure sensitive adhesive; and (g) an electromagnetic interference shield positioned between said first glass substrate and said liquid crystal display panel.

* * * * *